United States Patent
Cho et al.

(10) Patent No.: US 9,533,375 B2
(45) Date of Patent: Jan. 3, 2017

(54) TEMPERATURE SENSING APPARATUS, LASER PROCESSING SYSTEM, AND TEMPERATURE MEASURING METHOD

(71) Applicant: Industrial Technology Research Institute, Hsinchu (TW)

(72) Inventors: Chia-Hung Cho, Hsinchu (TW); Yi-Chen Hsieh, Changhua County (TW); Kai-Ping Chuang, Hsinchu County (TW); Sen-Yih Chou, Hsinchu (TW); Chun-Jen Lin, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 329 days.

(21) Appl. No.: 14/504,433

(22) Filed: Oct. 2, 2014

(65) Prior Publication Data

US 2016/0096236 A1    Apr. 7, 2016

(51) Int. Cl.
*B23K 26/34* (2014.01)
*B23K 26/067* (2006.01)
(Continued)

(52) U.S. Cl.
CPC .......... *B23K 26/345* (2013.01); *B23K 26/032* (2013.01); *B23K 26/034* (2013.01); *B23K 26/082* (2015.10);
(Continued)

(58) Field of Classification Search
CPC ... B23K 26/345; B23K 26/034; B23K 26/032; B23K 26/428; B23K 26/067; G01J 5/0806
(Continued)

(56) References Cited

U.S. PATENT DOCUMENTS 5,275,327 A    1/1994  Watkins et al.
6,188,041 B1   2/2001  Kim et al.
(Continued)

FOREIGN PATENT DOCUMENTS

CN    103407296    11/2013
TW    I395662      5/2013
TW    M473297      3/2014

OTHER PUBLICATIONS

Doubenskaia et al., "Comprehensive Optical Monitoring of Selective Laser Melting," JLMN—Journal of Laser Micro/Nanoengineering, Nov. 2012, pp. 236-243.
(Continued)

*Primary Examiner* — Samuel M Heinrich
(74) *Attorney, Agent, or Firm* — Jianq Chyun IP Office

(57) ABSTRACT

A temperature sensing apparatus configured to measure a temperature distribution of a surface to be measured is provided. The temperature sensing apparatus includes a lens set, a filtering module, a plurality of sensor arrays, and a processing unit. The lens set is configured to receive radiation from the surface to be measured. The filtering module is configured to filter the radiation from the lens set into a plurality of radiation portions respectively having different wavelengths. The sensor arrays are configured to respectively sense the radiation portions. The processing unit is configured to calculate an intensity ratio distribution of the radiation between the different wavelengths according to the radiation portions respectively sensed by the sensor arrays and determine the temperature distribution according to the intensity ratio distribution. A laser processing system and a temperature measuring method are also provided.

29 Claims, 8 Drawing Sheets

(51) Int. Cl.
*B23K 26/30* (2014.01)
*B23K 26/03* (2006.01)
*G01J 5/08* (2006.01)
*B29C 67/00* (2006.01)
*B22F 3/105* (2006.01)

(52) U.S. Cl.
CPC .......... *B23K 26/342* (2015.10); *B23K 26/428* (2013.01); *G01J 5/0806* (2013.01); *B22F 3/1055* (2013.01); *B22F 2003/1056* (2013.01); *B29C 67/0077* (2013.01)

(58) Field of Classification Search
USPC .......... 219/121.61, 121.62, 121.65, 121.66; 374/121; 419/61; 264/40.1, 497; 250/339.04; 118/642
See application file for complete search history.

(56) References Cited

U.S. PATENT DOCUMENTS

| | | | |
|---|---|---|---|
| 6,344,625 | B1 | 2/2002 | Kim et al. |
| 6,555,780 | B1 | 4/2003 | Kim et al. |
| 6,930,278 | B1* | 8/2005 | Chung .................. B23K 26/34 219/121.83 |
| 8,153,930 | B1* | 4/2012 | Hawryluk ......... H01L 21/67115 219/121.65 |
| 8,354,608 | B2 | 1/2013 | Dave et al. |
| 8,395,084 | B2* | 3/2013 | Tanaka ............... B23K 26/0738 219/121.6 |
| 8,668,859 | B2 | 3/2014 | Pettis |
| 9,089,926 | B2* | 7/2015 | Pfitzner .................. B23K 26/03 |
| 2010/0140236 | A1 | 6/2010 | Cai et al. |
| 2011/0259862 | A1* | 10/2011 | Scott ..................... B23K 26/12 219/121.73 |

OTHER PUBLICATIONS

Craeghs et al., "Determination of geometrical factors in Layerwise Laser Melting using optical process monitoring," Optics and Lasers in Engineering, Optics and Lasers in Engineering, Dec. 2011, pp. 1440-1446.

Lott et al., "Design of an Optical system for the In Situ Process Monitoring of Selective Laser Melting (SLM)," Physics Procedia, May 2011, pp. 683-690.

Y. Chivel, "Optical in-process temperature monitoring of selective laser melting," Physics Procedia, May 2013, pp. 000-000.

Craeghs et al., "Feedback control of Layerwise Laser Melting using optical sensors," Physics Procedia, Sep. 2010, pp. 505-514.

Furumoto et al., "Investigation of laser consolidation process for metal powder by two-color pyrometer and high-speed video camera," CIRP Annals—Manufacturing Technology, Jan. 2013, pp. 223-226.

* cited by examiner

TEMPERATURE SENSING APPARATUS, LASER PROCESSING SYSTEM, AND TEMPERATURE MEASURING METHOD

TECHNICAL FIELD

The technical field relates to a temperature sensing apparatus, a laser processing system, and a temperature measuring method.

BACKGROUND

In traditional two-dimensional printing, ink is printed on a paper so as to form a two-dimensional pattern. Recently, three-dimensional printing, also known as additive manufacturing, is researched and developed widely and deeply. In an additive manufacturing technology, a three-dimensional image is sliced into a plurality of two-dimensional images by a computer, and a laser beam is used to weld material powder layer by layer respectively according to the data of the two-dimensional images, so as to form a three-dimensional object.

In a selective laser melting process, the variation of melt pool affects the yield of a printed three-dimensional product. For three dimensional parts, the border conditions of the conductive heat transport have a large influence on the melt pool dimensions, e.g. the shape and size. If the welded structure is suspended, the shape and the temperature distribution of the melt pool irradiated by a laser beam over the suspended welded structure are different from those over a non-suspended welded structure due to different heat dissipation conditions. In this case, if the power of the laser beam is maintained the same as the power for the non-suspended welded structure, the shape of the final welded three-dimensional object will not be satisfactory.

SUMMARY

One of exemplary embodiments provides a temperature sensing apparatus configured to measure a temperature distribution of a surface to be measured. The temperature sensing apparatus includes a lens set, a filtering module, a plurality of sensor arrays, and a processing unit. The lens set is configured to receive radiation from the surface to be measured. The filtering module is configured to filter the radiation from the lens set into a plurality of radiation portions respectively having different wavelengths. The sensor arrays are configured to respectively sense the radiation portions. The processing unit is configured to calculate an intensity ratio distribution of the radiation between the different wavelengths according to the radiation portions respectively sensed by the sensor arrays and determine the temperature distribution according to the intensity ratio distribution.

One of exemplary embodiments provides a laser processing system including a laser source, a scanning unit, and the aforementioned temperature sensing apparatus. The laser source is configured to emit a laser beam. The scanning unit is configured to cause the laser beam to scan a surface. The temperature sensing apparatus is configured to measure a temperature distribution of the scanned surface, i.e. the aforementioned surface to be measured.

One of exemplary embodiments provides a temperature measuring method including: receiving radiation from a surface to be measured; filtering the radiation into a plurality of radiation portions respectively having different wavelengths; sensing the radiation portions to respectively obtain a plurality of intensity distributions; calculating an intensity ratio distribution of the radiation between the different wavelengths according to the intensity distributions; and determining a temperature distribution of the surface to be measured according to the intensity radiation distribution.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
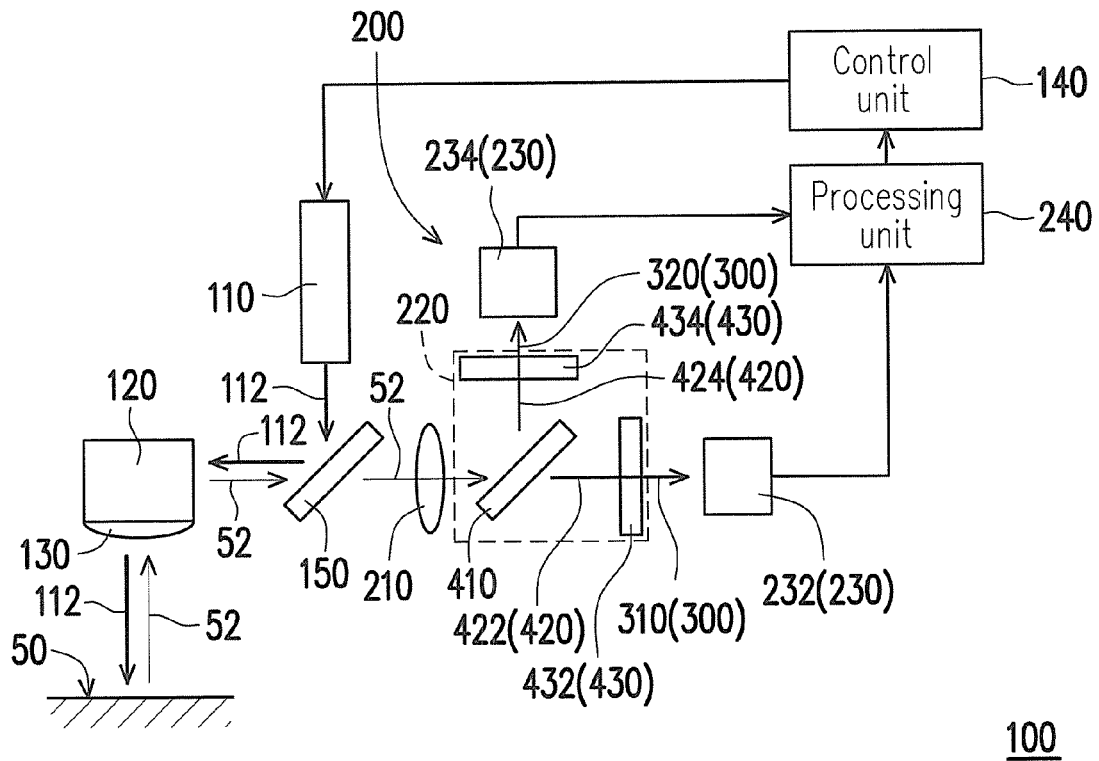
FIG. 1 is a schematic view of a laser processing system according to an exemplary embodiment.

FIG. 1 is a schematic view of a laser processing system according to an exemplary embodiment. Referring to FIG. 1, a laser processing system 100 in this embodiment includes a laser source 110, a scanning unit 120, and a temperature sensing apparatus 200. The laser source 110 is configured to emit a laser beam 112. The scanning unit 120 is configured to cause the laser beam 112 to scan a surface 50. For example, the scanning unit 120 may include two rotatable mirrors respectively rotating along two axes, and the two axes may be perpendicular to each other or inclined with respect to each other.

In this embodiment, the laser processing system 100 is an additive manufacturing (AM) system, i.e. a three-dimensional (3D) printing system, and the surface 50 is a surface of a melt pool of a powder layer scanned by the laser beam 112. Specifically, the AM system first provides a powder layer, and then welds at least a part of the powder layer by the scanning laser beam 112 to form a first patterned layer. Next, a second powder layer is provided on the patterned layer, and welded to form a second patterned layer, wherein the second patterned layer and the first patterned layer are welded together. Based on this principle, a plurality of powder layers are provided in sequence, and selectively welded in sequence to form a 3D object. The image of the melt pool 54 is exemplarily shown in FIG. 2.

The temperature sensing apparatus 200 is configured to measure a temperature distribution of the scanned surface 50, i.e. a surface to be measured. In this embodiment, the temperature sensing apparatus 200 includes a lens set 210, a filtering module 220, a plurality of sensor arrays 230 (two sensor arrays 232 and 234 are exemplarily shown in FIG. 1), and a processing unit 240. The lens set 210 is configured to receive radiation 52, e.g. thermal radiation, from the surface 50 to be measured. The filtering module 220 is configured to filter the radiation 52 from the lens set 210 into a plurality of radiation portions 300 (two radiation portions 310 and 320 are exemplarily shown in FIG. 1) respectively having different wavelengths. The sensor arrays 230 are configured to respectively sense the radiation portions 300. In this embodiment, when the powder layer is scanned by the laser beam 112, the temperature of the portion of the powder layer irradiated by the laser beam 112 is rapidly increased, and the radiation 52 emitted by the powder layer is changed due to the change of temperature. In this embodiment, the wavelength range of the radiation 52 includes the infrared (IR) band.

In this embodiment, the filtering module 220 includes a beam splitter 410 and a plurality of optical filters 430 (two optical filters 432 and 434 are exemplarily shown). The beam splitter 410 is disposed on a path of the radiation 52 from the lens set 210 and splits the radiation 52 into a plurality of partial radiation beams 420 (two partial radiation beams 422 and 424 are exemplarily shown). The optical filters 430 (e.g. 432 and 434) are respectively disposed on paths of the partial radiation beams 420 (e.g. 422 and 424) and respectively filters the partial radiation beams 420 (e.g. 422 and 424) into the radiation portions 300 (e.g. 310 and 320). Specifically, the beam splitter 410 may be a transflective minor, for example, a half-transmissive and half-reflective mirror or a neutral density filter.

Figure 3A:
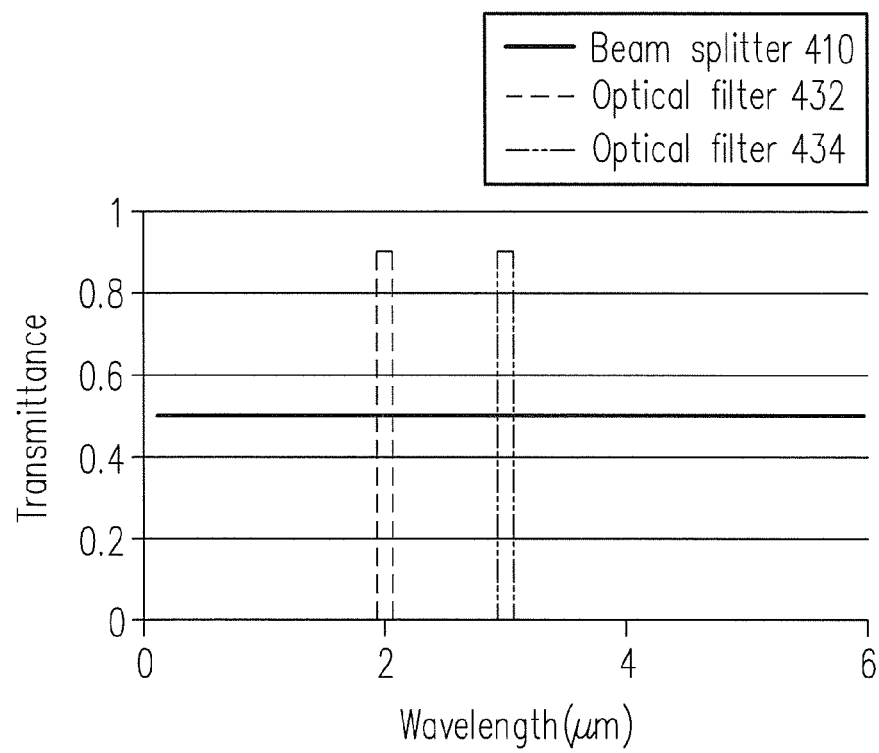
FIG. 3A shows transmittance spectra of the beam splitter and the optical filters in FIG. 1.
Figure 3B:
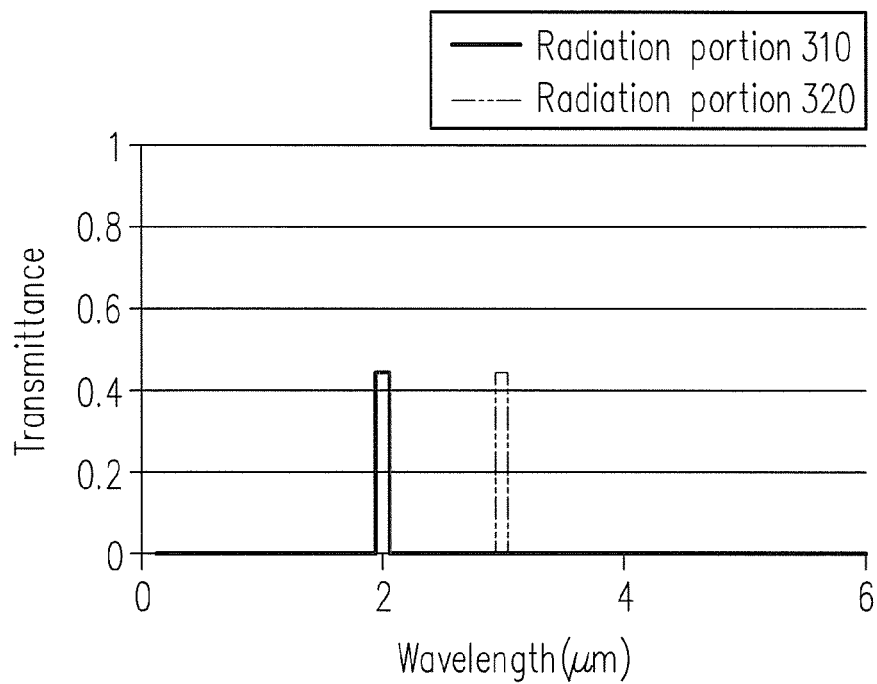
FIG. 3B shows spectra of the radiation portions respectively transmitted to the sensor arrays.

FIG. 3A shows transmittance spectra of the beam splitter 410, the optical filter 432, and the optical filter 434 in FIG. 1, and FIG. 3B shows spectra of the radiation portion 310 and the radiation portion 320 respectively transmitted to the sensor array 232 and the sensor array 234. Referring to FIGS. 1, 3A, and 3B, due to the combination of the beam splitter 410, the optical filter 432, and the optical filter 434, the spectra of the radiation portion 310 and the radiation portion 320 are as shown in FIG. 3B. That is, the transmittance peak of the radiation portion 310 is at the wavelength around 2 µm, and the transmittance peak of the radiation portion 320 is at the wavelength around 3 µm.

Figure 4A:
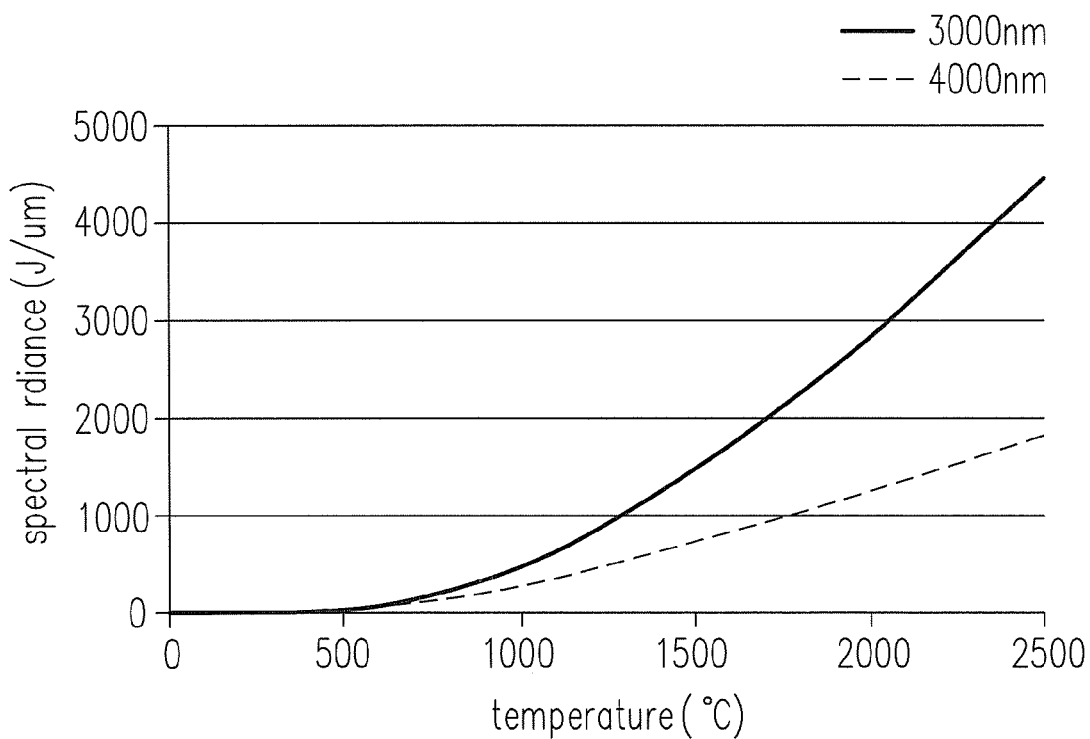
FIG. 4A shows radiated energy curves of black-body radiation respectively at the wavelengths of 3 µm and 4 µm.
Figure 4B:
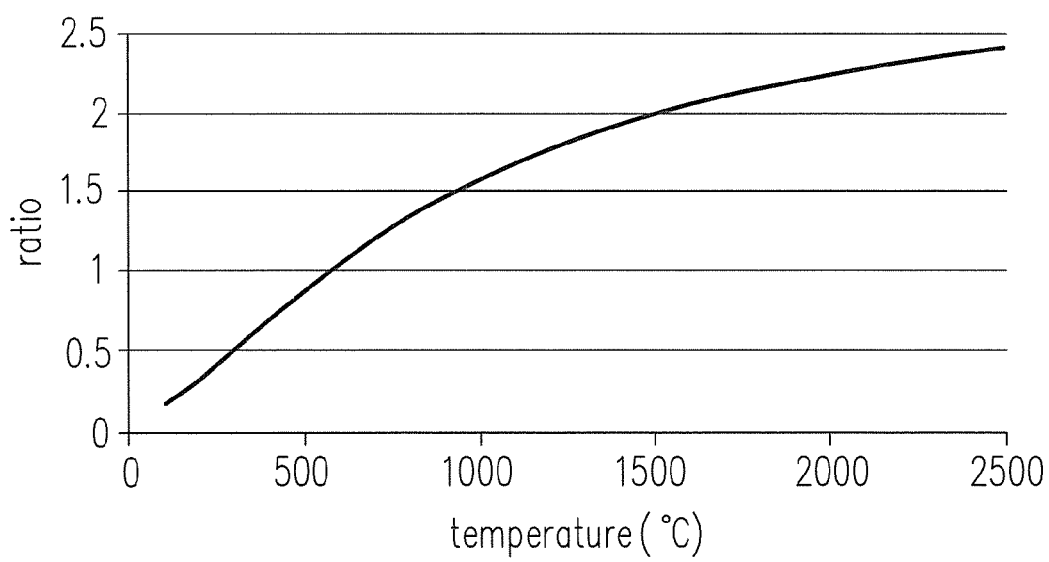
FIG. 4B shows the ratio curve of the two radiated energy curves in FIG. 4A.

FIG. 4A shows radiated energy curves of black-body radiation respectively at the wavelengths of 3 µm and 4 µm, and FIG. 4B shows the ratio curve of the two radiated energy curves in FIG. 4A. Referring to FIGS. 4A and 4B, the ratio curve of the two radiated energy curves is obtained by dividing the spectral radiance values of 3 µm at the temperatures respectively by the spectral radiance values of 4 µm at the corresponding temperatures. The variation of each of the radiated energy curves is small when the temperature increases from 0° C. to 1000° C. As a result, it is hard to determine the temperature of the surface 50 between 0° C. and 1000° C. according to a single radiation portion, either the radiation portion 310 or the radiation portion 320. However, the ratio curve of the two radiated energy curves in FIG. 4A varies greatly and about linearly when the temperature increases from 0° C. to 1000° C. Therefore, it is easy to determine the temperature of the surface 50 between 0° C. and 1000° C. according to the two radiation portions 310 and 320. In this embodiment, the ratio curve is suitable for being used to measure the temperature in the range of 100 to 2500° C.

Figure 2:
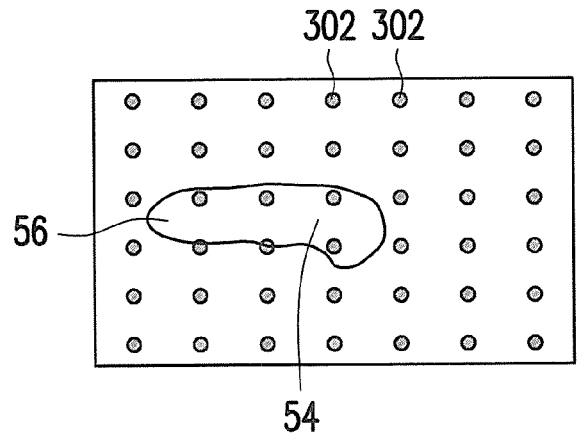
FIG. 2 shows the image of the melt pool in FIG. 1.

In this embodiment, the processing unit 240 is configured to calculate the intensity ratio distribution of the radiation 52 between the different wavelengths according to the radiation portions 300 (e.g. 310 and 320) respectively sensed by the sensor arrays 230 (e.g. 232 and 234) and determine the temperature distribution according to the intensity ratio distribution. In this embodiment, each of the sensor arrays 230 includes a plurality of optical sensors arranged in a one-dimensional array or in a two-dimensional array. FIG. 2 shows the radiation image of the melt pool 54 formed on the image plane of the sensor array 230 and the positions of the optical sensors 302 on the image plane. That is, each of the sensor arrays 230 includes the optical sensors 302 arranged in a two-dimensional array. In this embodiment, the optical sensors 302 are photodiodes.

As shown in FIG. 3B, in this embodiment, each optical sensor 302 of the sensor array 232 may sense the radiation portion 310 having the wavelength about 2 µm, and each optical sensor 302 of the sensor array 234 may sense the radiation portion 320 having the wavelength about 3 µm. The ratio of the radiation portion 310 and the radiation portion 320 can correspond to the ratio of the radiated energy curve of black body at 2 µm and the radiated energy curve of black body at 3 µm. As a result, according to the radiation portions 310 and 320 and the ratio of the radiated energy curve of black body at 2 µm and the radiated energy curve of the black body at 3 µm, the processing unit 240 may determine the temperature of the surface 50 at the position corresponding to the optical sensor 302. Moreover, the plurality of optical sensors 302 arranged in arrays can sense the radiation 52 from different positions of the surface 50, so that the sensor array 230 may obtain the intensity distribution of the radiation portion 300. A optical sensor 302 in the sensor array 232 and a corresponding optical sensor 302 in the sensor array 234 may obtain the intensity of the radiation portion 310 and the intensity of the radiation portion 320 corresponding to a position on the surface 50, and the processing unit 240 can calculate the ratio of these two intensities at each position on the surface corresponding to the optical sensor 302. Therefore, the processing unit 240 can calculate the intensity ratio distribution of the radiation 52 between the different wavelengths (e.g. 2 µm and 3 µm). Moreover, according to the curve of the ratio of the radiated energy curves of the black body, the calculated ratio can correspond to a temperature. As a result, the processing unit 240 can determine the temperature distribution at the positions on the surface 50 respectively corresponding to the optical sensors of the sensor arrays 232 and 234.

In this embodiment, since the plurality of the sensor arrays 230 are used to respectively sense the radiation portions 300, and since the intensity ratio distribution of the radiation portions 300 is calculated, the temperature sensing apparatus 200 can have a wide temperature detecting range, e.g. from 100° C. to 2500° C. Moreover, in this embodiment, the laser processing system 100 further includes a control unit 140 electrically connected to the processing unit 240 and configured to adjust the laser beam 112 according to the feedback of the temperature distribution. For example, according to the temperature distribution of the melt pool 54, the control unit 140 can adjust the power of the laser beam 112 so as to maintain the temperature distribution and the shape of the melt pool 54 stable. As a result, the shape and structure of the final welded three-dimensional object will be satisfactory whether the welded structure is suspended or not. In addition, since the temperature distribution of the melt pool 54 is obtained, the processing unit 240 may monitor the shape of the melt pool 54 according to the temperature distribution. This is because the shape of the melt pool 54 is related to the temperature distribution of the melt pool 54.

In this embodiment, the sensor arrays 230 respectively sense the radiation portions 300 successively, and the processing unit 240 determine the temperature distribution successively. That is, the temperature sensing apparatus 200 can successively monitor the change of the melt pool 54. In addition, in this embodiment, the refresh rate of each of the sensor arrays 230 is greater than or equal to 1 kHz, which matches the scanning speed of the laser beam 112, so that the sensor arrays 230 can sense the melt pool 54 in a real-time method. Besides, the processing unit 240 is configured to monitor the scanning direction of the laser beam 112 according to the temperature distribution. For example, based on the temperature distribution, the shape of the melt pool 54 is determined, and the direction of the tail 56 of the melt pool 54 is determined. Therefore, the scanning direction of the laser beam 112 can be determined according to the direction of the tail 56.

Figure 5:
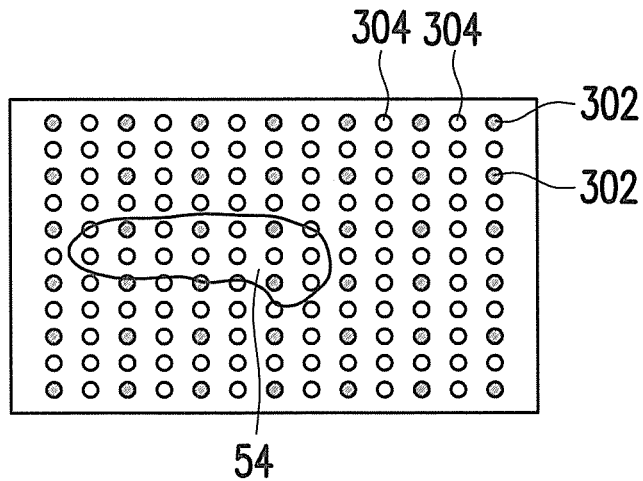
FIG. 5 shows the image of the melt pool, the positions of the optical sensors and the positions of the interpolated points in FIG. 1.

FIG. 5 shows the image of the melt pool, the positions of the optical sensors and the positions of the interpolated points in FIG. 1. Referring to FIGS. 1 and 5, the processing unit 240 is configured to interpolate temperature distribution data according to the temperature distribution. For example, the temperature data at the interpolated points 304 between the positions of the optical sensors 302 may be calculated by the processing unit 240. Therefore, the condition of the melt pool 54 may be determined more accurately.

In this embodiment, the scanning unit 120 is disposed on the path of the radiation 52 between the surface 50 and the lens set 210. The laser processing system 100 may further include a beam splitter 150 configured to cause the laser beam 112 from the laser source 110 to be transmitted to the scanning unit 120 and configured to cause the radiation 52 from the scanning unit 120 to be transmitted to the lens set 210. For example, the beam splitter 150 may reflect the laser beam 112 from the laser source 110 to the scanning unit 120, and allow the radiation 52 from the surface 50 to transmit through and then the radiation 52 be transmitted to the lens set 210. However, in some other embodiments, the beam splitter 150 may allow the laser beam 112 from the laser source 110 to transmit through and the laser beam 112 be then transmitted to the scanning unit 120, and reflect the radiation 52 from the surface 50 to the lens set 210.

In this embodiment, the laser beam 112 and the radiation 52 share a substantially same path between the surface 50 and the beam splitter 150. As a result, the temperature sensing apparatus 200 may always monitor the position irradiated by the laser beam 112 even if the laser beam 112 is scanning the surface 50.

In this embodiment, the laser processing system 100 includes a lens 130, e.g. an f-theta lens, on the path of the laser beam 112 and the radiation 52, so that the change of the radiation angle of the mirrors in the scanning unit 120 is more linearly related to the positon change on the surface 50.

Figure 6A:
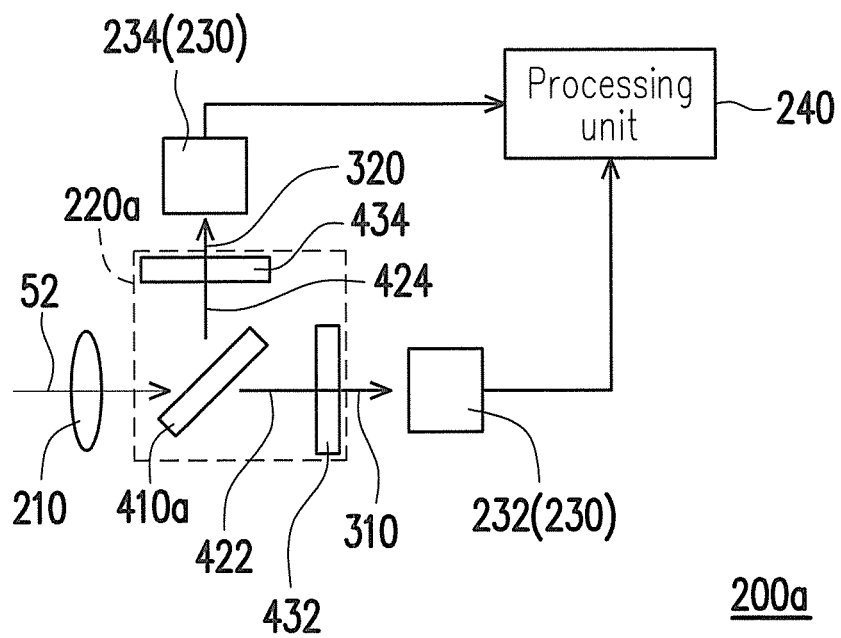
FIG. 6A is a schematic view of a temperature sensing apparatus according to another exemplary embodiment.
Figure 6B:
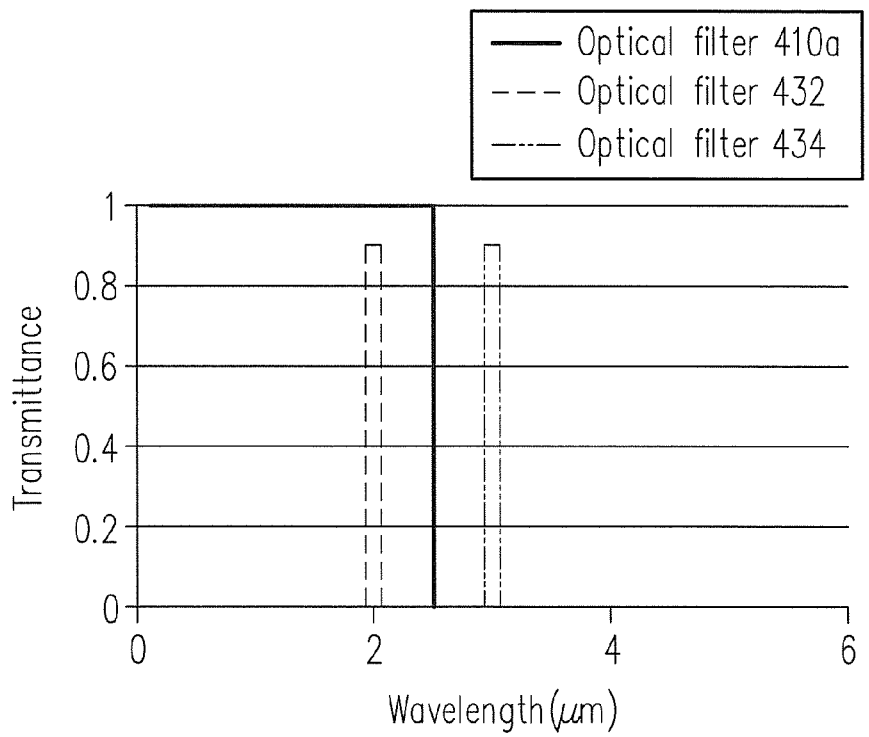
FIG. 6B shows transmittance spectra of the optical filters in FIG. 6A.
Figure 6C:
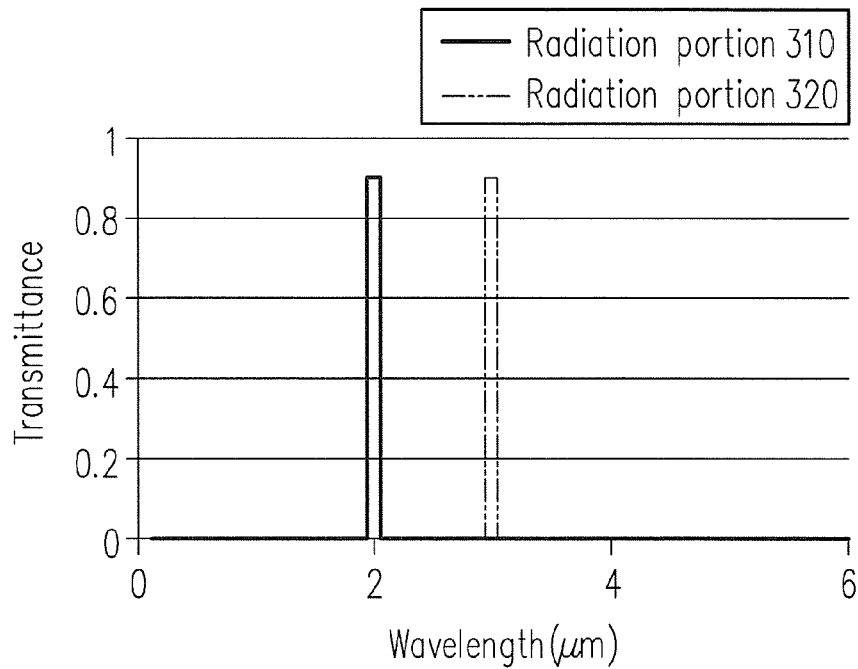
FIG. 6C shows spectra of the radiation portions in FIG. 6A respectively transmitted to the sensor arrays.

FIG. 6A is a schematic view of a temperature sensing apparatus according to another exemplary embodiment, FIG. 6B shows transmittance spectra of the optical filter 410a, the optical filter 432, and the optical filter 434 in FIG. 6A, and FIG. 6C shows spectra of the radiation portion 310 and the radiation portion 320 in FIG. 6A respectively transmitted to the sensor array 232 and the sensor array 234. Referring to FIGS. 6A to 6C, the temperature sensing apparatus 200a in this embodiment is similar to the temperature sensing apparatus 200 in FIG. 1, and the difference therebetween is as follows. In this embodiment, the filtering module 220a includes an optical filter 410a and the optical filters 432 and 434. The optical filter 410a is disposed on a path of the radiation 52 from the lens set 210 and splits the radiation 52 into the partial radiation beams 422 and 424 respectively having different wavelength ranges, and the optical filters 432 and 434 respectively filter the partial radiation beams 422 and 424 into the radiation portions 310 and 320. In this embodiment, the optical filter 410a is a low pass filter, and the optical filters 432 and 434 are band pass filters.

Figure 7A:
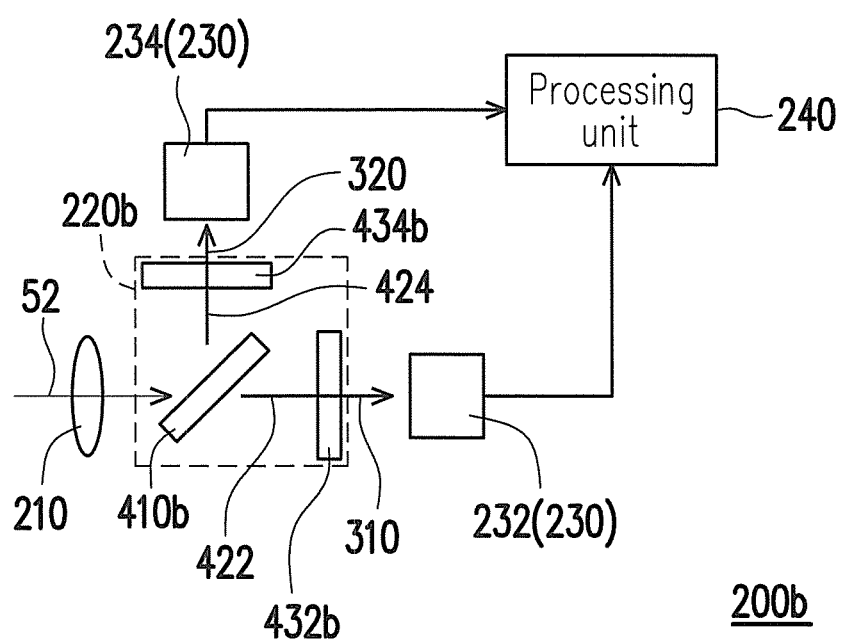
FIG. 7A is a schematic view of a temperature sensing apparatus according to another exemplary embodiment.
Figure 7B:
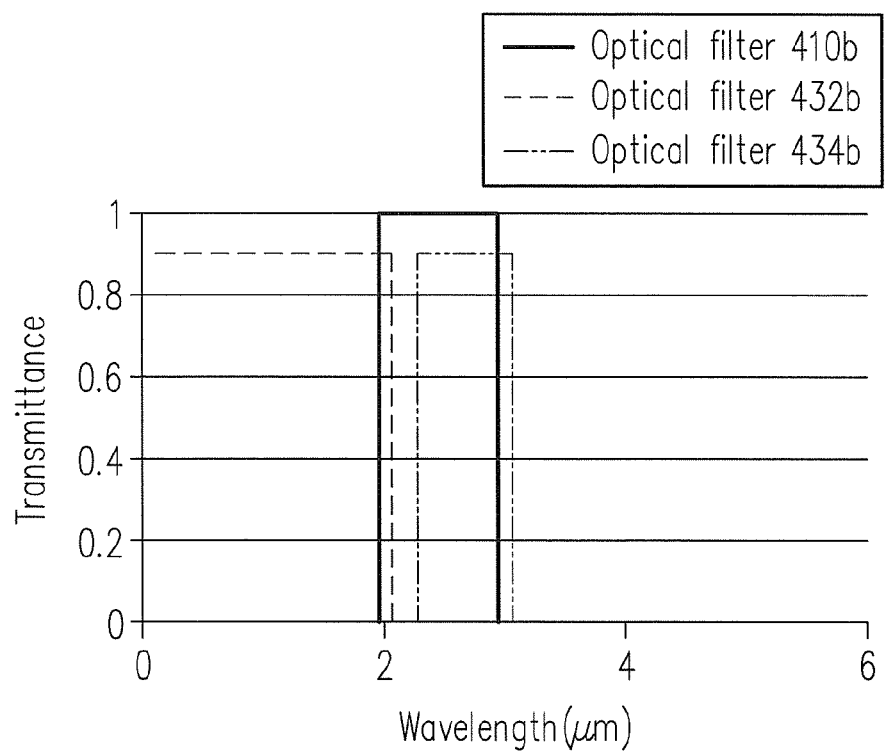
FIG. 7B shows transmittance spectra of the optical filters in FIG. 7A.
Figure 7C:
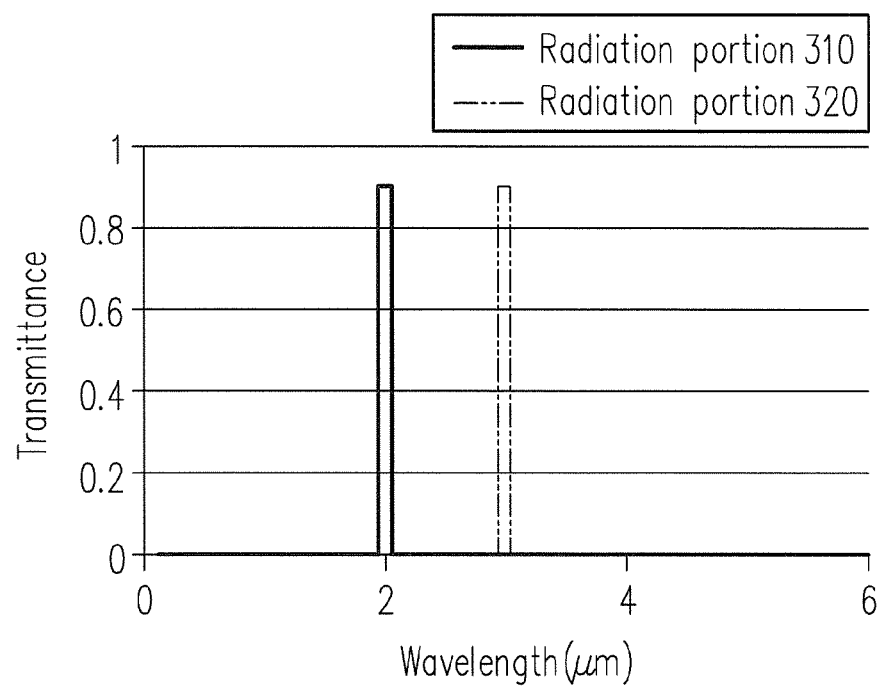
FIG. 7C shows spectra of the radiation portions in FIG. 7A respectively transmitted to the sensor arrays.

FIG. 7A is a schematic view of a temperature sensing apparatus according to another exemplary embodiment, FIG. 7B shows transmittance spectra of the optical filter 410b, the optical filter 432b, and the optical filter 434b in FIG. 7A, and FIG. 7C shows spectra of the radiation portion 310 and the radiation portion 320 in FIG. 7A respectively transmitted to the sensor array 232 and the sensor array 234. Referring to FIGS. 7A to 7C, the temperature sensing apparatus 200b in this embodiment is similar to the temperature sensing apparatus 200a in FIG. 6A, and the difference therebetween is as follows. In this embodiment, the optical filter 410b and the optical filter 434b in the filtering module 220b are band pass filters, and the optical filter 432b in the filtering module 220b is a low pass filter. In some other embodiments, the optical filter 410b, 432b, and 434b may be any appropriate combination of band pass filters, high pass filters, low pass filters, and notch filters as long as the filtering module 220b filters the radiation 52 into radiation portions 310 and 320 respectively having different wavelengths.

Figure 8:
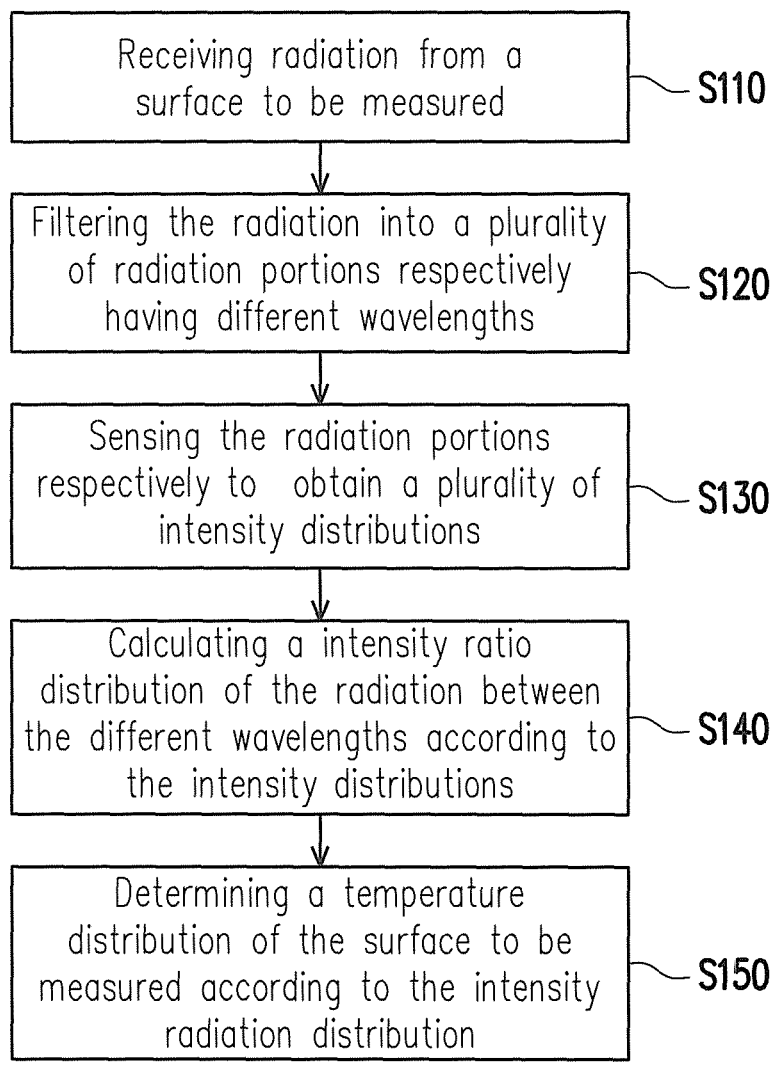
FIG. 8 is a flow chart of a temperature measuring method according to an exemplary embodiment.

FIG. 8 is a flow chart of a temperature measuring method according to an exemplary embodiment. Referring to FIGS. 1 and 8, a temperature measuring method in this embodiment may be implemented by the aforementioned temperature sensing apparatuses 200, 200a, and 200b and the temperature sensing apparatuses in other embodiments, and the following takes the temperature sensing apparatus 200 as an example. The temperature measuring method in this embodiment includes following steps. First, in step S110, the radiation 52 from the surface 50 is received. In this embodiment, the radiation 52 is received by the lens set 210. Next, in step S120, the radiation 52 is filtered into the radiation portions 300 respectively having different wavelengths. In this embodiment, the radiation 52 is filtered by the filtering module 220. Then, in step S130, the radiation portions 300 are sensed respectively to obtain a plurality of intensity distributions. Each of the intensity distributions may be in a matrix form. In this embodiment, the radiation portions 300 are sensed by the sensor arrays 230. Each of the intensity distributions is a one-dimensional or two-dimensional distribution data of intensity. In this embodiment, since the sensor array 230 is a two-dimensional array, the intensity distribution is two-dimensional distribution data of intensity. Moreover, in this embodiment, the frame rate of sensing the radiation portions 300 may be greater than or equal to 1 kHz. Afterwards, in step S140, the intensity ratio distribution of the radiation 52 between the different wavelengths is calculated according to the intensity distributions. In this embodiment, the intensity ratio distribution is calculated by the processing unit 240, and the calculated intensity ratio data may be in a matrix form. After that, in step S150, the temperature distribution of the surface 50 is determined according to the intensity radiation distribution. In this embodiment, the temperature distribution data may be in a matrix form. Other details of the temperature measuring method have been described in the aforementioned embodiments of the laser processing system and the temperature sensing apparatus, and will not be repeated herein.

In this embodiment, since the radiation portions 300 are sensed to respectively obtain the intensity distributions, and since the intensity ratio distribution of the radiation portions 300 is calculated, the temperature measuring method in this embodiment can have a wide temperature detecting range, e.g. from 100° C. to 2500° C. Moreover, the temperature measuring method may also achieve the aforementioned functions of the temperature sensing system or the laser processing system.

In conclusion, in the laser processing system, the temperature sensing system and the temperature measuring method according to the exemplary embodiments, since the radiation from the surface to be measured is filtered into a plurality of radiation portions, and since the intensity ratio distribution of the radiation portions is calculated, a wide temperature detecting range may be achieved, so as to increase the applicability of the exemplary embodiments.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A temperature sensing apparatus configured to measure a temperature distribution of a surface to be measured, the temperature sensing apparatus comprising:
   a lens set configured to receive radiation from the surface to be measured;
   a filtering module configured to filter the radiation from the lens set into a plurality of radiation portions respectively having different wavelengths;
   a plurality of sensor arrays configured to respectively sense the radiation portions; and
   a processing unit configured to calculate an intensity ratio distribution of the radiation between the different wavelengths according to the radiation portions respectively sensed by the sensor arrays and determine the temperature distribution according to the intensity ratio distribution.

2. The temperature sensing apparatus according to claim 1, wherein a refresh rate of each of the sensor arrays is greater than or equal to 1 kHz.

3. The temperature sensing apparatus according to claim 1, wherein each of the sensor arrays comprises a plurality of optical sensors arranged in a one-dimensional array or in a two-dimensional array.

4. The temperature sensing apparatus according to claim 1, wherein the surface to be measured is a surface of a melt pool of a powder layer scanned by a laser beam, and the processing unit is configured to monitor a scanning direction of the laser beam according to the temperature distribution.

5. The temperature sensing apparatus according to claim 1, wherein the filtering module comprises:
   a beam splitter disposed on a path of the radiation from the lens set and splitting the radiation into a plurality of partial radiation beams; and
   a plurality of optical filters respectively disposed on paths of the partial radiation beams and respectively filtering the partial radiation beams into the radiation portions.

6. The temperature sensing apparatus according to claim 1, wherein the filtering module comprises:
   a first optical filter disposed on a path of the radiation from the lens set and splitting the radiation into a plurality of partial radiation beams respectively having different wavelength ranges; and
   a plurality of second optical filters respectively disposed on paths of the partial radiation beams and respectively filtering the partial radiation beams into the radiation portions.

7. The temperature sensing apparatus according to claim 1, wherein the sensor arrays respectively sense the radiation portions successively, and the processing unit determine the temperature distribution successively.

8. The temperature sensing apparatus according to claim 1, wherein the surface to be measured is a surface of a melt pool of a powder layer scanned by a laser beam, and the processing unit is configured to monitor a shape of the melt pool according to the temperature distribution.

9. The temperature sensing apparatus according to claim 1, wherein the processing unit is configured to interpolate temperature distribution data according to the temperature distribution.

10. A laser processing system comprising:
    a laser source configured to emit a laser beam;
    a scanning unit configured to cause the laser beam to scan a surface; and
    a temperature sensing apparatus configured to measure a temperature distribution of the scanned surface, the temperature sensing apparatus comprising:
       a lens set configured to receive radiation from the scanned surface;
       a filtering module configured to divide the radiation from the lens set into a plurality of radiation portions respectively having different wavelengths;
       a plurality of sensor arrays configured to respectively sense the radiation portions; and
       a processing unit configured to calculate an intensity ratio distribution of the radiation between the different wavelengths according to the radiation portions respectively sensed by the sensor arrays and determine the temperature distribution according to the intensity ratio distribution.

11. The laser processing system according to claim 10, wherein a refresh rate of each of the sensor arrays is greater than or equal to 1 kHz.

12. The laser processing system according to claim 10, wherein each of the sensor arrays comprises a plurality of optical sensors arranged in a one-dimensional array or in a two-dimensional array.

13. The laser processing system according to claim 10, wherein the scanned surface is a surface of a melt pool of a powder layer scanned by the laser beam, and the processing unit is configured to monitoring a scanning direction of the laser beam according to the temperature distribution.

14. The laser processing system according to claim 10, wherein the filtering module comprises:
    a beam splitter disposed on a path of the radiation from the lens set and splitting the radiation into a plurality of partial radiation beams; and
    a plurality of optical filters respectively disposed on paths of the partial radiation beams and respectively filtering the partial radiation beams into the radiation portions.

15. The laser processing system according to claim 10, wherein the filtering module comprises:
 a first optical filter disposed on a path of the radiation from the lens set and splitting the radiation into a plurality of partial radiation beams respectively having different wavelength ranges; and
 a plurality of second optical filters respectively disposed on paths of the partial radiation beams and respectively filtering the partial radiation beams into the radiation portions.

16. The laser processing system according to claim 10, wherein the sensor arrays respectively sense the radiation portions successively, and the processing unit determine the temperature distribution successively.

17. The laser processing system according to claim 10, wherein the scanned surface is a surface of a melt pool of a powder layer scanned by the laser beam, and the processing unit is configured to monitor a shape of the melt pool according to the temperature distribution.

18. The laser processing system according to claim 10, wherein the processing unit is configured to interpolate temperature distribution data according to the temperature distribution.

19. The laser processing system according to claim 10, wherein the scanning unit is disposed on a path of the radiation between the scanned surface and the lens set.

20. The laser processing system according to claim 19 further comprising a beam splitter configured to cause the laser beam from the laser source to be transmitted to the scanning unit and configured to cause the radiation from the scanning unit to be transmitted to the lens set.

21. The laser processing system according to claim 20, wherein the laser beam and the radiation share a substantially same path between the scanned surface and the beam splitter.

22. A temperature measuring method comprising:
 receiving radiation from a surface to be measured;
 filtering the radiation into a plurality of radiation portions respectively having different wavelengths;
 sensing the radiation portions to respectively obtain a plurality of intensity distributions;
 calculating an intensity ratio distribution of the radiation between the different wavelengths according to the intensity distributions; and
 determining a temperature distribution of the surface to be measured according to the intensity ratio distribution.

23. The temperature measuring method according to claim 22, wherein a refresh rate of sensing the radiation portions is greater than or equal to 1 kHz.

24. The temperature measuring method according to claim 22, wherein each of the intensity distributions is a one-dimensional or two-dimensional distribution data of intensity.

25. The temperature measuring method according to claim 22, wherein the surface to be measured is a surface of a melt pool of a powder layer scanned by a laser beam, and the the temperature measuring method further comprises monitoring a scanning direction of the laser beam according to the temperature distribution.

26. The temperature measuring method according to claim 22, wherein the surface to be measured is a surface of a melt pool of a powder layer scanned by a laser beam, and the the temperature measuring method further comprises adjusting the laser beam according to a feedback of the temperature distribution.

27. The temperature measuring method according to claim 22 further comprising interpolating temperature distribution data according to the temperature distribution.

28. The temperature measuring method according to claim 22, wherein the radiation portions are successively sensed, and the temperature distribution is successively determined.

29. The temperature measuring method according to claim 22, wherein the surface to be measured is a surface of a melt pool of a powder layer scanned by a laser beam, and the temperature measuring method further comprises monitoring a shape of the melt pool according to the temperature distribution.

* * * * *